3,189,478
CONDUCTIVE SILVER COATING OF RESINS HAVING AMINE GROUPS AT THE SURFACE
James Cooper, Jr., Elkins Park, Pa., assignor to General Electric Company, a corporation of New York
No Drawing. Filed July 2, 1962, Ser. No. 207,082
1 Claim. (Cl. 117—47)

This invention pertains to the art of chemically depositing silver upon the surface of an organic plastic.

A well-known and commonly used formulation for depositing silver by chemical reduction is that credited to Brashear, which appears in many formularies and of which one version is as follows:

One of the objects of the invention is to provide a conductive silver coating on resins having amine groups at their surfaces.

A reducing solution is prepared consisting of 700 ml. of distilled water and 80 gms. of sucrose. When the sucrose has been dissolved in the distilled water, there are added 175 ml. of ethyl alcohol, 90% concentration, and 3 ml. of nitric acid, specific gravity 1.42. Water is then added to make a total of 1 liter. Tradition requires that this solution be allowed to stand for at least a week before use in order that the sucrose may be inverted in the presence of the acid; but moderate heating will promote the inversion sufficiently that such long waiting period is unnecessary. A silver solution containing 1 gm. of silver nitrate and 0.5 gm. of potassium hydroxide to 150 ml. of solution is also required. This is caused to contain silver in solution as an ammonia complex ion by the addition of ammonium hydroxide until the resulting precipitate of silver hydroxide is almost completely redissolved by the presence of excess ammonia. The sucrose, or reducing solution, is mixed with the solution containing the silver, in the proportion of 25 parts of silver solution to one part of reducing solution. This mixture is the silvering solution; upon mixture at room temperature, the reaction between the two solutions causes a reduction of the silver which is apparently catalyzed by solid surfaces, so that a clean glass surface immersed in the silvering solution will receive a deposit of metallic silver.

The same silvering method may be used to produce a silver coating upon many organic plastics. The conventional process is to clean the surface of the plastic with a mild alkali cleaner and to then "sensitize" the surface by treatment with a concentrated solution of stannous chloride containing an excess of hydrochloric acid. The surface of the plastic is then duly rinsed with distilled water to remove any soluble materials. Application of the mixed silver and reducing solutions to the plastic body then usually produces a uniform deposit of silver.

Attempts to use this conventional method to silver the surface of an epoxide hardened with aliphatic amines were unsuccessful. The process described above produced a non-uniform coating, with streaks and bare spots on which no silver at all appeared. Since this resin is close-linked and may have free amine radicals at its surface, it occurred to me that the resin might be acting as an ion-exchange resin, and selectively absorbing certain ions which would interfere with the deposition of silver at those points. The thought then occurred to me that altering the pH at the surface of the epoxide might solve the problem. Reducing the pH at the surface by treating the epoxide with hydrogen chloride solution, after the usual treatment with stannous chloride, produced no improvement in the silver deposition. Moving in the opposite direction by raising the pH at the surface by treatment of the epoxide with ammonium hydroxide solution, after the usual treatment with stannous chloride, was markedly successful in producing uniform deposition of silver over the surface of the epoxide.

A sample of the same resin formulation which could not be satisfactorily silvered by the conventional process described above was treated as follows:

The resin was first freed from adherent grease by rinsing with dilute alkaline solution; this is conventional and was used in the previous unsuccessful experiments also. The surface was then rinsed with concentrated stannous chloride solution (which, as in the previous unsuccessful experiments, had an excess of hydrogen chloride present to prevent precipitation of stannous hydroxide). This was then rinsed off with distilled water, and the surface of the plastic was treated with ammonium hydroxide solution. This was then rinsed off, and the silvering solution, composed of mixed reducing and silver solutions, as above described, was applied. A uniform heavy deposit of silver, uniform over the surface of the plastic, was produced. By repeating the above on fresh samples of plastic, varying the concentration of ammonium hydroxide and the time it was allowed to remain in contact with the plastic, it was found that any time longer than a minute and any concentration greater than one percent of ammonia in solution would produce satisfactory results, neither value being critical. More dilute ammonia solutions applied for long times may be expected to be effective, but from a commercial viewpoint there is little to be gained by making the operation more time-consuming. Since concentrated ammonium hydroxide is unpleasant to handle and irritant to the operator, there is no reason for using extremely high concentrations of ammonium hydroxide. Therefore, operation with moderate concentrations of ammonium hydroxide, such as a 5% solution, for a minute, is a preferred one.

It will be observed from the preceding description that my invention differs from conventional procedure in the treatment of the plastic surface with ammonium hydroxide after the conventional treatment with stannous chloride solution.

The class of plastics to which my invention is applicable is those epoxides which are hardened with aliphatic amines; aromatic amine hardeners usually require application of heat to promote hardening, and the resulting product does not usually have large numbers of amine groups at the surface. The particular resin used in my tests was composed of a bisphenol-A/epichlorohydrin resin sold commercially under the trade designation "Ciba 506" by the Ciba Company, Fair Lawn, New Jersey, with a diethylaminepropylamine hardener to the extent of twenty-one percent of the resin weight. This resin was flexibilized by the use of a flexibilizer of commercial grade cashew nut oil polymer derivative, and contained small quantities of dye and inert inorganic filler ($SiO_2$). It is a room-temperature hardening formulation, as a result of the use of an aliphatic amine hardener.

What is claimed is:

In the process of silvering, by Brashear's method, the surface of a resin having free amine radicals at its surface, which process comprises the step of sensitizing the said surface with a solution of stannous chloride prior to application of Brashear's silvering solution thereto, the improvement comprising the step of treating the said surface of the plastic, after said sensitizing with said solution of stannous chloride, with a solution of ammonium hydroxide.

References Cited by the Examiner

UNITED STATES PATENTS 2,764,502    9/56    Emerson _____ 117—47

OTHER REFERENCES

Wein: "Metallizing Non-Conductors," 1945, Metal and Industry Pub. Co., New York, N.Y. (pages 27 and 28 relied on).

RICHARD D. NEVIUS, *Primary Examiner.*